US006076816A

United States Patent [19]

Tünkers

[11] Patent Number: 6,076,816

[45] **Date of Patent: *Jun. 20, 2000**

[54] TOGGLE LEVER TIGHTENING DEVICE FOR USE IN THE AUTOMOTIVE INDUSTRY

[75] Inventor: Josef-Gerhard Tünkers, Ratingen, Germany

[73] Assignee: I.S.I. International S.A., Geneva, Switzerland

[ * ] Notice: This patent is subject to a terminal disclaimer.

[21] Appl. No.: 09/199,007

[22] Filed: Nov. 24, 1998

[30] Foreign Application Priority Data

Nov. 24, 1997 [DE] Germany ........................... 197 51 950

[51] Int. Cl.[7] ........................................ B23Q 3/08

[52] U.S. Cl. ........................................ 269/32; 269/91

[58] Field of Search ........................................ 269/32

[56] References Cited

U.S. PATENT DOCUMENTS

| | | | |
|---|---|---|---|
| 3,371,953 | 3/1968 | Blatt . | |
| 3,482,831 | 12/1969 | Blatt . | |
| 4,021,027 | 5/1977 | Blatt | 269/32 |
| 4,905,973 | 3/1990 | Blatt | 269/32 |
| 5,072,652 | 12/1991 | Blatt . | |
| 5,201,838 | 4/1993 | Roudaut . | |
| 5,845,897 | 12/1998 | Tunkers | 269/32 |

FOREIGN PATENT DOCUMENTS

| | | |
|---|---|---|
| 256 208 A2 | 2/1988 | European Pat. Off. . |
| 313 767 A1 | 5/1989 | European Pat. Off. . |

(List continued on next page.)

OTHER PUBLICATIONS

Quick Change Gripper Head Mounts, I.S.I. Manufacturing Inc. (1995).
Neue Kraft in Der Freifertechnik, ISI Automation Anlagen.
Das Grip–Lot™ System, ISI Manufacturing Inc.
DE–STA–CO, Metallerzeugnisse GmbH (Dec. 1993).
Sommer Automatic, Kniehebelgreifer.
Schunk Spann–und Greiftechnik, Fritz Schunk GmbH.
DE–STA–CO, metallerzeugnisse GmbH.

*Primary Examiner*—David A. Scherbel
*Assistant Examiner*—Benjamin Halpern
*Attorney, Agent, or Firm*—Brinks Hofer Gilson & Lione

[57] ABSTRACT

A toggle lever tightening device for use in the automobile industry in the assembly of automobile bodies. Toggle lever tightening devices secure one workpiece relative to a second work piece to locate the pieces for permanent connection. This toggle lever tightening device prevents deformation of the grip head and its seatings. The design of this toggle lever tightening device allows the grip head and cylinder to be constructed of light metal alloys without experiencing damaging deformation of the grip head. A very simple bearing arrangement for this toggle lever tightening device has made possible an embodiment in which a single tightening arm is provided on one side of the grip head. This single tightening arm design is highly desirable in the automobile industry. However, it results in an unfavorable introduction of forces. The pivot shaft that is driven by the toggle lever arrangement and functions to drive the tightening arm is axially and radially seated in the grip head. As a result of this construction, the axial and radial force are transferred to the walls of the grip head dependably and without causing deformation, twisting or sluggishness of the toggle lever arrangement. Bearings in the form of roller bodies are provided that simultaneously function as the axial and radial bearing. This simple bearing arrangement has permitted the use of light metals or light metal alloys for the construction of this mechanism. Major forces are dependably absorbed by an adjustable support plate that is fixed at the top dead center location of the toggle arrangement. The support plate and the fixed stop are made of hardened steel or of a ceramic material, and can be embodied with appropriately large surfaces so that the surface pressure in this area are kept low.

13 Claims, 3 Drawing Sheets

FOREIGN PATENT DOCUMENTS

| | | |
|---|---|---|
| 317 924 A2 | 5/1989 | European Pat. Off. . |
| 359 073 A2 | 3/1990 | European Pat. Off. . |
| 595 074 A1 | 5/1994 | European Pat. Off. . |
| 636 449 B1 | 3/1995 | European Pat. Off. . |
| 2 427 179 | 12/1979 | France . |
| 2 618 713 | 2/1989 | France . |
| 25 55 207 | 7/1976 | Germany . |
| 3022376 C2 | 12/1981 | Germany . |
| 89 08 288 | 11/1989 | Germany . |
| 90 05 183 | 8/1990 | Germany . |
| 41 11 430 A1 | 10/1991 | Germany . |
| 90 16 781 | 5/1992 | Germany . |
| 92 15 151 | 3/1993 | Germany . |
| 93 11 132 | 10/1993 | Germany . |
| 295 04 267 U | 8/1995 | Germany . |
| 2 95 13 586 U | 1/1996 | Germany . |
| 196 16 441 | 4/1996 | Germany . |

TOGGLE LEVER TIGHTENING DEVICE FOR USE IN THE AUTOMOTIVE INDUSTRY

FIELD OF THE INVENTION

The invention relates to a toggle lever tightening device, in particular for use by the automobile industry in the construction of car bodies.

BACKGROUND OF THE INVENTION

Many versions of toggle lever tightening devices, particularly for use by the automotive industry in the construction of car bodies are known. Some such toggle lever tightening devices are represented and described, for example, in German Utility Model 93 11 131 U1 and in European Patent Publication EP 0 636 449 B1. In the automotive industry, efforts have been made to reduce the weight of tools such as toggle lever tightening devices by the use of light metals. For this reason, efforts have been made to not construct the housings, i.e., the grip head and the cylinder, of toggle lever tightening devices from steel, as was previously the case. Rather, these portions of the device are being constructed from light metal alloys, in particular aluminum alloys. Such lighter toggle lever tightening devices are used particularly in mobile installations. Since, in the course of tightening the grip head it must absorb large reactive forces, there is a concern that the housing walls will be deformed when light metals are used. More particularly, the concern is that, after a period of use, an accurate tightening position and defined tightening forces will no longer be transmitted.

If, in addition, the toggle lever tightening device is of the type in which a tightening arm is provided on only one side, large axial and radial forces are exerted on the seating, which can lead to twisting of the toggle lever tightening device, which then becomes unusable.

A tightening device can be found in U.S. Pat. No. 4,905,973, whose shaft, which is fixed in place in the housing, is seated by means of a radial and an axial bearing, respectively, in both end areas. A device corresponding to a support plate is provided against which the toggle lever arrangement can be supported in the area of top dead center.

German Patent Publication DE 196 16 441 C1 shows a toggle lever tightening device for use in automobile body construction having a grip head which is rectangular in a cross section and is orthogonal with the longitudinal axis of the piston rod. This device is constructed of two housing elements and has a cylinder adjoining the end of the grip head as an axial extension. The cylinder has a piston which can be pressurized alternately on both sides by a pressure medium, such as air pressure. The piston is sealed, guided and displaceable in the longitudinal direction. When the pistons extend, the piston rod extends through the cylinder and a hollow chamber of the grip head where a toggle lever arrangement is fastened to the free end of the piston rod. The toggle lever is connected with a tightening arm having limit switches or respectively positioned sensors in the form of micro-switches, inductive switches, pneumatic switches or sensors, which are integrated in a chamber of the grip head. The switches can be adjusted in relation to each other and are arranged and fastened on a holder which constitutes a cover for them. The holder is in the form of an interrogation cassette, exchangeable as a whole, in the form of a board in the area of a slit in the axial direction of the grip head. The interrogation cassette has a “T”-shaped form in a view from above, with a fastening rail and a flange. This is followed by a profile extending with its longitudinal axis parallel to the longitudinal axis of the piston rod wherein the interrogation cassette is plugged in from all four sides, in particular from the back, of the housing of the grip head through a narrow slit extending in the direction of the longitudinal axis of the piston rod. The capability of adding on the toggle lever tightening arrangement is maintained in such a way that the profile seals the joints of the slit toward the outside to the greatest possible extent. This toggle lever tightening arrangement is intended to attain the object of being capable of being installed on the device elements, not only from the rear, but also from all four sides while keeping the advantages known from cassette technology.

A toggle lever tightening arrangement with a grip head and a cylinder joining it in the axial extension, is also known from European Patent Publication EP 0 370 914 A1. In this publication, the piston is guided, is longitudinally displaceable and is sealed. The piston can be pressurized alternately on both sides, with pressure from a pressure medium and extends axially with a piston rod through the cylinder and a hollow chamber in the grip head. A toggle lever arrangement is fastened to the free end of the piston rod and is coupled with a tightening arm arranged on a side of the grip head. This coupling includes a fork-shaped tightening arm seated on both end sections of a shaft wherein the toggle lever arrangement is seated on a shaft fixed in place in the grip head. A support plate is also provided which is arranged resiliently or as an elastic spring.

BRIEF SUMMARY OF THE INVENTION

It is the object of the invention to create a toggle lever tightening device for use by the automotive industry for the construction of automobile bodies in which deformation of the grip head or its seating is prevented. It is another object of this invention to prevent damaging deformation of the grip head when light metals or light metal alloys are used for the grip head and/or the cylinder. A further object of the invention is to prevent damaging deformation of the grip head in an embodiment in which, in spite of the arrangement of only a single tightening arm on one side of the grip head and, therefore, an unfavorable introduction of forces, the construction of the radial and axial bearing is kept simple.

With the invention, the shaft driven by the toggle lever arrangement, which is laterally fixed in place in the housing and which also drives, for example, the tightening arm on one side, is axially and radially seated in the grip head. Because of this, the axially and radially occurring force components are introduced into the walls of the grip head dependably and without deformation, without causing twisting or sluggishness of the toggle lever arrangement.

A further advantage lies in that, even with the use of light metals or light metal alloys, the large forces that occur are dependably absorbed by the support plate and by a fixed stop for an exact tightener adjustment, in particular during the passage over top dead center. The support plate and the fixed stop can be made of hardened steel or of a ceramic material, and can be embodied with appropriately large surfaces so that the surface pressure in this area can be kept low. Thus, no damaging deformation of the grip head walls is caused despite the use of aluminum or aluminum alloys. In this case, the roller bodies simultaneously function as the axial and radial bearing.

In another embodiment of this invention, the support plate is arranged on a housing wall of the grip head and is held by a screw, which has been screwed, into the support plate from the outside.

In still another embodiment of this invention, the fixed stop can also be arrested by one or several screws acting on the fixed stop from the outside, or wherein it can possibly also be embodied to be adjustable by means of screws or the like. This fixed stop makes an exact tightener adjustment possible so that wear, which occurs after some time, can also be compensated for by means of an adjustment.

DETAILED DESCRIPTION OF THE INVENTION

Figure 1:
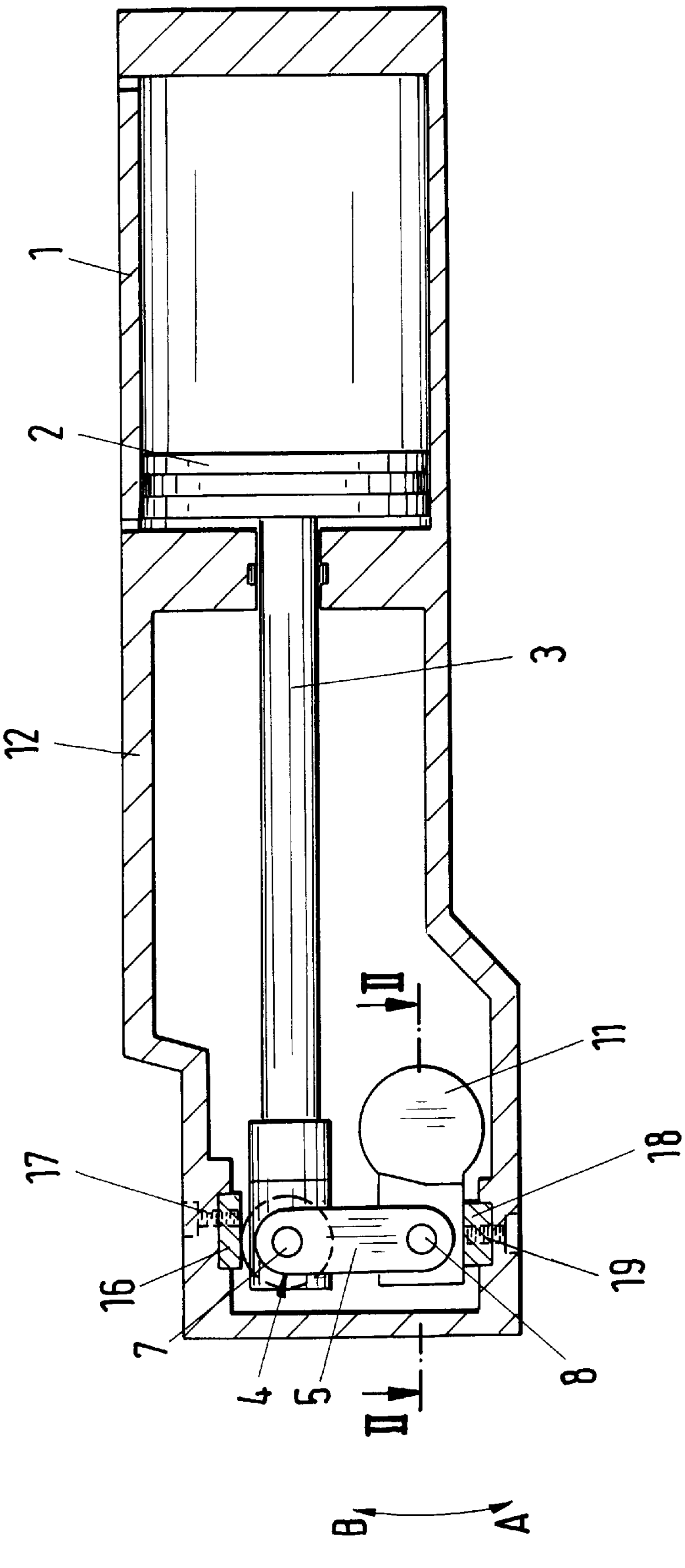
FIG. 1 is an axial longitudinal section of the toggle lever tightening device.
Figure 2:
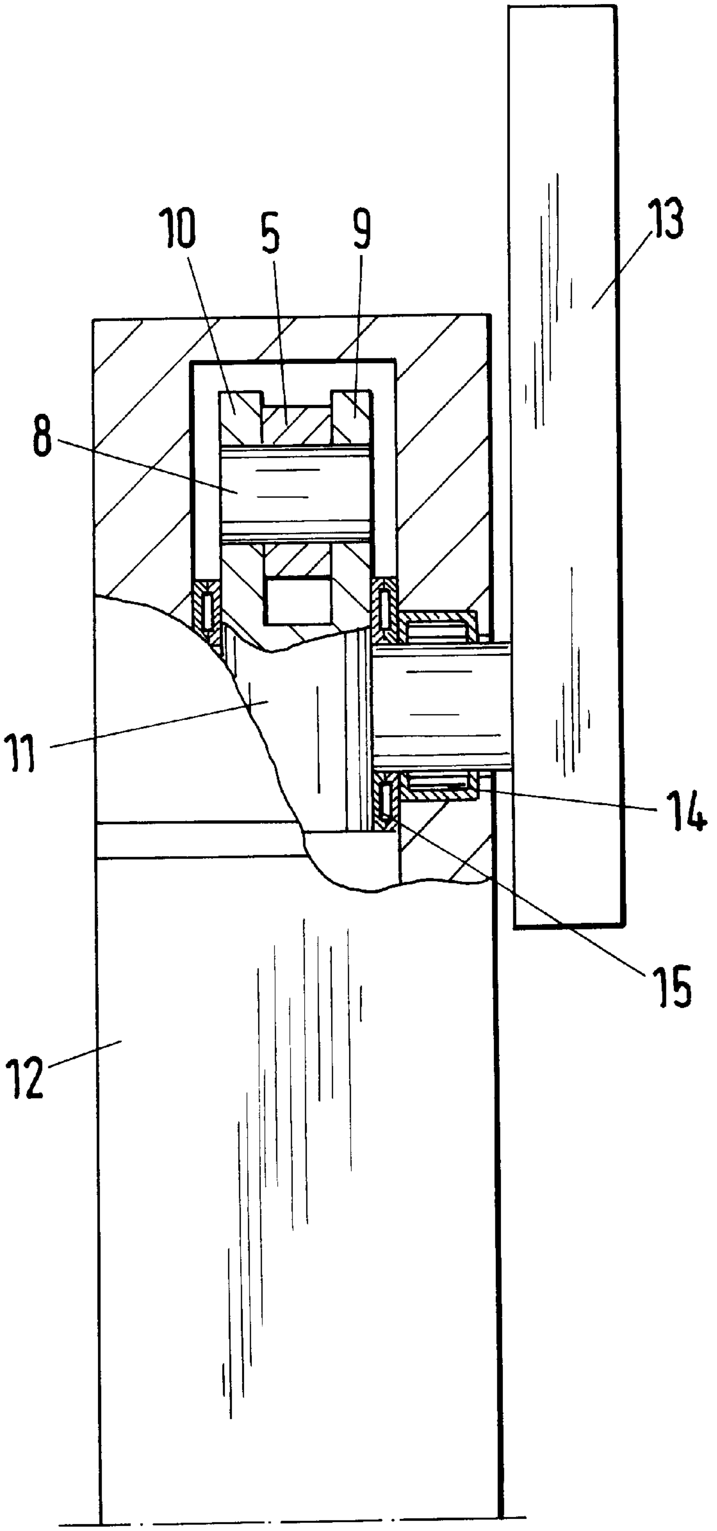
FIG. 2 is a view from above FIG. 1, partially in section along line II—II of FIG. 1.

As best seen in FIG. 1, a cylinder 1 has a piston 2 that can be alternatively pressurized on either side with, for example, compressed air. When pressurized, a side piston 2 is guided by the cylinder 1 and is displaced in the longitudinal direction. Piston 2 includes seals to prevent the pressure media from passing from one side to the other.

A piston rod 3 is connected with the piston 2 and is provided with a toggle lever arrangement 4 at its end. Toggle lever arrangement 4 includes a pivot bracket 5 which is pivotably movable to a limited extent along an arc in the direction A or B about toggle lever bolt 7. The pivot bracket 5 is pivoted about a bore formed on one end on toggle lever bolt 7. Pivot bracket 5 has another bore at its other end through which a hinge pin 8 extends. Both ends of hinge pin 8 protrude from pivot bracket 5 and are received for pivotal movement in bores formed in hinge brackets 9 and 10. Hinge brackets 9 and 10 are integral with a head portion of shaft 11.

The grip head 12 is provided as an extension of cylinder 1 and receives portions of the piston rod 3 and the toggle lever arrangement 4 with its pivot shafts 7 and 8. The walls of grip head 12 carry a shaft 11.

In the illustrated embodiment, the shaft 11 extends out one side of the housing of the grip head 12, and has a tightening arm 13 secured thereto. In a variation of this, both ends of the shaft 11 can extend out of the housing of the grip head 12. Supported on these two end sections is a tightening arm designed in the form of a fork having a centered or off-centered tightening element.

In the embodiment, in accordance with FIGS. 1 to 4, each end of the shaft 11 is seated for pivotal movement by a radial bearing 14 and an axial bearing 15, respectively. Only one radial bearing 14 and one axial bearing 15 are identified in FIG. 2. The pivotal arrangement for the opposite end of the shaft 11 is the same as that illustrated.

The bearings 14 and 15 are embodied as roller bearings, in this case as needle bearings, so that large forces can be absorbed in the axial and radial direction while, at the same time, providing a very easy action.

Therefore, forces, in particular those, which are asymmetrically introduced from the tightening, arm 13 into the grip head 12, will not result in sluggishness. Instead, these forces are introduced dependably into the grip head 12 and provide a very easy action. The grip head 12 and the cylinder 1 are made of a light metal or of a light metal alloy, for example an aluminum alloy. In place of this, these elements can also be made of cast metal, steel or plastic.

As can be seen from FIG. 1, a support plate 16 of hardened steel or a suitable ceramic material is arranged in the area of the top dead center position of toggle lever 4 and is held by at least one screw 17. The screw 17 can be actuated through a bore in the grip head 12 which is accessible from the outside and enters the support plate 16 in order to hold it in place. The toggle lever arrangement 4 is supported on it in the area of the top dead center position so that the wall elements of the grip head 12 will not be deformed.

A fixed stop 18, in the form of a plate, is provided opposite the support plate 16 which is also held in place by at least one screw 19 or the like. The fixed stop 18 is used for an accurate tightener adjustment and can also be made of hardened steel or a ceramic material. The screw 19 or the like can make the adjustment and setting of the fixed stop 18 possible.

Figure 3:
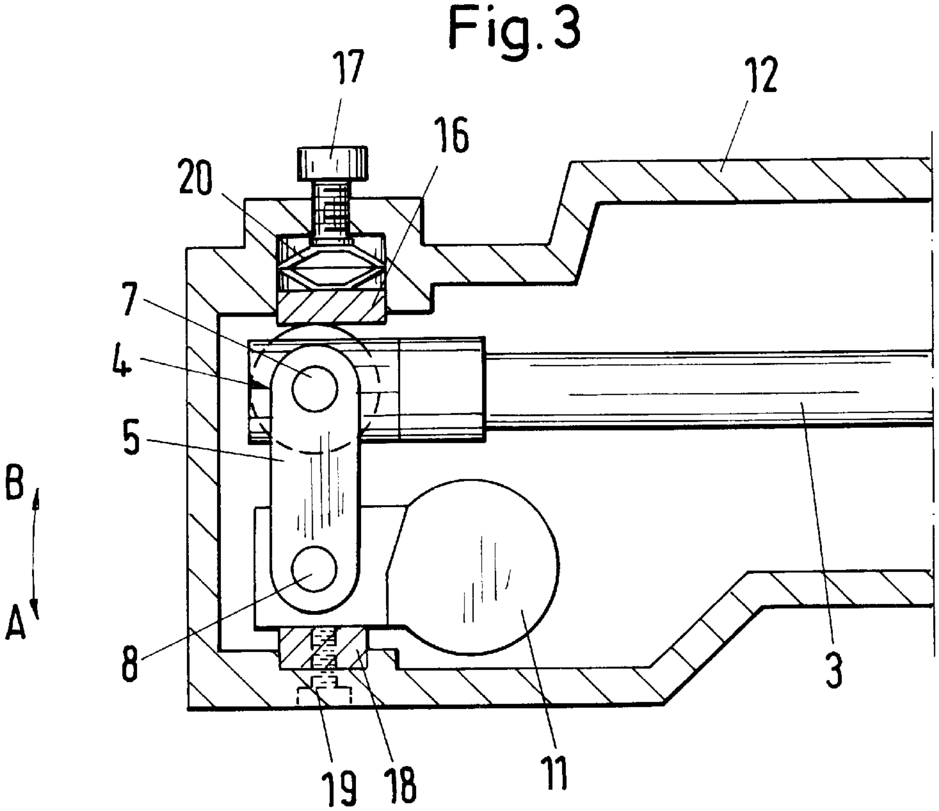
FIG. 3 represents a detail of another embodiment.

In the embodiment shown in FIG. 3, the same reference numerals have been used for elements of like function. This embodiment differs from the above-described embodiment in that the support plate 16 is spring-elastically arranged on a spring element 20, for example, one of several plate springs. In this way, the support plate can yield slightly so that when reaching the top dead center position, the toggle lever 4 properly catches. Prestressing of the spring element 20 can be infinitely varied and fixed in place. In place of the plate springs shown, one or several pressure springs made of helical compression springs or a polyurethane block embodies as a plastic block, can also constitute the spring element 20. In this case, the plastic block is pre-pressed in order to make hysteresis impossible to a large degree and for achieving the required elasticity and shore hardness.

The exact angular setting of the toggle lever joint can be determined by both the support plate 16, as well as the fixed stop 18, in which the predetermined tightening force in the area of the top dead center position is achieved. Furthermore, wear and/or tolerances are compensated.

Figure 4:
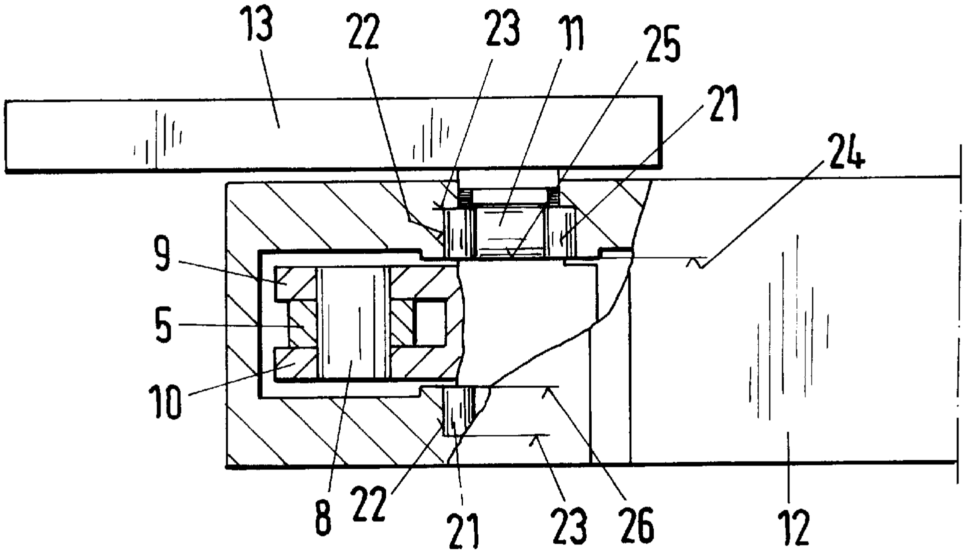
FIG. 4 represents a further embodiment of the invention.

In the embodiment in accordance with FIG. 4, roller bodies 21 are provided over the circumference of the appropriate longitudinal section of the shaft 11, which are preferably arranged at an even angular distance with respect to each other. These roller bodies 21 are here embodied as barrels or as cylindrical roller bodies. The roller bodies 21 are located in a cutout 22, the shape of which has been adapted to the roller bodies and formed in the wall of the grip head 12. This cutout 22 can be a radial depression in the respective wall of the grip head 12. The radial seating of the shaft 11 is formed in this way. With their outwardly oriented front faces 23, the roller bodies 21 contact a collar of the cutout 22. However, on their opposite front faces 24, the roller bodies 21 contact a lateral wall 25 or 26 of the associated hinge bracket 9 or 10 and, by this means, function as an axial bearing.

It can be seen in the drawings that, the hinge brackets 9 and 10, are connected with each other as a one-piece fork and are provided on their facing inner lateral walls 25 and 26 with facing protrusions, shoulders or rises, against which the front faces of the roller bodies 21 contact.

If necessary, the roller bodies can, in addition to having a slight barrel-shape or crown on their rolling surfaces that engage in the cutout 22, also have a barrel-shape or crown on their front faces. However, this is not absolutely necessary for their functioning as axial and radial bearings.

The characteristics described in the specification, the claims and in the abstract, as well as those being apparent from the drawings, can be important, either individually or in any arbitrary combination, for realizing the invention.

I claim:

1. A toggle lever tightening device for use by the automotive industry in the assembly of automobile bodies comprising:

a grip head (12) including walls that form a hollow chamber housing;

a cylinder (1) is joined to said grip head as an axial extension thereof, said cylinder having an axially extending piston (2) guided therein in a displaceable and sealing manner;

said piston including a piston rod (3) that extends through said cylinder and said hollow chamber, said piston rod being axially aligned with said piston and having a free end;

a shaft (11) journaled in openings formed in said walls of said hollow chamber housing such that said shaft is fixed against axial movement relative to said hollow chamber housing;

a forked-shaped hinge bracket secured to said shaft at an interconnection within said hollow chamber housing, said forked-shaped hinge bracket including lateral walls adjacent to its interconnection with said shaft;

a toggle lever arrangement (4) fastened to said free end of the piston rod and to said forked-shaped hinge bracket, said toggle lever having a top dead center position at which a center line extending through its connection to said free end of the piston rod and said forked-shaped hinge bracket is normal to said piston rod;

a tightening arm (13) secured to said shaft outside of said hollow chamber housing;

cutouts (22) formed in the inner surfaces of said walls of the hollow chamber about the periphery of said openings, said cutouts forming shoulders in said walls about said openings;

a plurality of roller bodies (21) provided in said cutouts, said roller bodies being equally spaced circumferentially of said shaft to thus provide a single set of radial bearings for the shaft, said roller bodies including outward and inward facing faces, said outward facing faces engaging said shoulders of the cutouts and said inward facing faces engaging said lateral walls of the forked-shaped hinge bracket to thus provide axial and radial bearings for the shaft; and a support plate (16) fixed in a support plate cutout formed in said grip head in the top dead center area to prevent the free end of the piston rod from bending upwardly when said toggle lever arrangement reaches the top dead center area.

2. The toggle lever tightening device in accordance with claim 1 wherein the roller bodies are embodied as barrel-shaped.

3. The toggle lever tightening device in accordance with claim 1 wherein the roller bodies are embodied as cylinders.

4. The toggle lever tightening device in accordance with claims 1, 2 or 3 wherein the roller bodies have front faces that are slightly barrel-shaped.

5. The toggle lever tightening device in accordance with claim 1 or 2 or 3 wherein the support plate arranged in said support plate cutout is held from the outside in an adjustable and settable manner by at least one screw.

6. The toggle lever tightening device in accordance with claims 1, 2 or 3 wherein a fixed stop is arranged on the inner wall of the grip head for limiting the movement of the connection between said forked-shaped hinge bracket and said toggle lever arrangement, said fixed stop being settable and arrestable, by at least one screw which is accessible from the outside.

7. The toggle lever tightening device in accordance with claims 1, 2 or 3 wherein the support plate is arranged resiliently.

8. The toggle lever tightening device in accordance with claims 1, 2 or 3 wherein the support plate is seated on a spring element with a presettable spring tension.

9. The toggle lever tightening device in accordance with claims 1, 2 or 3 wherein the support plate is seated on a spring element with a presettable spring tension and the spring element includes at least one plate spring, preferably a plate spring package.

10. The toggle lever tightening device in accordance with claim 9 and wherein the spring element is made of plastic.

11. The toggle lever tightening device in accordance with claim 1 or 2 or 3 wherein both the grip head and the cylinder are made of a light metal alloy, in particular an aluminum alloy.

12. The toggle lever tightening device in accordance with claim 1 or 2 or 3 wherein the grip head and the cylinder are made of steel.

13. The toggle lever tightening device in accordance with claim 1 wherein the roller bodies are embodied as cone-shaped.

* * * * *

UNITED STATES PATENT AND TRADEMARK OFFICE

CERTIFICATE OF CORRECTION

PATENT NO. : 6,076,816

DATED : June 20, 2000

INVENTOR(S) : Josef-Gerhard Tünkers

It is certified that error appears in the above-identified patent and that said Letters Patent is hereby corrected as shown below:

On the title page:

Under [30] "Foreign Application Priority Data" change "197 51 950" to -- 197 51 950.4 --.

Under [73] "Assignee" change "Geneva" to -- Geneve --.

Signed and Sealed this

Twenty-fourth Day of April, 2001

Attest:

Nicholas P. Godici

NICHOLAS P. GODICI

*Attesting Officer*

*Acting Director of the United States Patent and Trademark Office*